US008619850B1

(12) United States Patent
Smereski et al.

(10) Patent No.: US 8,619,850 B1
(45) Date of Patent: Dec. 31, 2013

(54) SYSTEM AND METHOD FOR MONITORING BROADCAST SIGNALS

(75) Inventors: Michael W. Smereski, Kennesaw, GA (US); Robert D. Butler, Powder Springs, GA (US)

(73) Assignee: The Weather Channel, LLC, Atlanta, GA (US)

( * ) Notice: Subject to any disclaimer, the term of this patent is extended or adjusted under 35 U.S.C. 154(b) by 1808 days.

(21) Appl. No.: 11/724,403

(22) Filed: Mar. 14, 2007

(51) Int. Cl.
*H04N 5/222* (2006.01)
*H04N 7/18* (2006.01)
*G06F 3/00* (2006.01)

(52) U.S. Cl.
USPC ........... 375/240; 348/180; 348/185; 348/192; 348/563; 348/722; 715/704; 715/708; 715/714; 715/734; 715/736; 725/118; 725/148; 725/153

(58) Field of Classification Search
USPC .......................................................... 375/240
See application file for complete search history.

(56) References Cited

U.S. PATENT DOCUMENTS

| 5,307,456 | A | * | 4/1994 | MacKay | 715/782 |
|---|---|---|---|---|---|
| 5,880,792 | A | * | 3/1999 | Ward et al. | 348/722 |
| 6,002,443 | A | * | 12/1999 | Iggulden | 348/553 |
| 6,184,918 | B1 | * | 2/2001 | Goldschmidt et al. | 725/20 |
| 6,208,636 | B1 | * | 3/2001 | Tawil et al. | 370/351 |
| 6,411,623 | B1 | * | 6/2002 | DeGollado et al. | 370/395.1 |
| 6,452,612 | B1 | * | 9/2002 | Holtz et al. | 715/723 |
| 6,862,429 | B2 | * | 3/2005 | Efron et al. | 455/3.06 |
| 7,526,568 | B1 | * | 4/2009 | Swanton et al. | 709/239 |
| 7,788,684 | B2 | * | 8/2010 | Petrovic et al. | 725/18 |
| 2001/0003846 | A1 | * | 6/2001 | Rowe et al. | 725/47 |
| 2002/0004936 | A1 | * | 1/2002 | Aras | 725/36 |
| 2002/0047902 | A1 | * | 4/2002 | Thomas et al. | 348/180 |
| 2004/0008220 | A1 | * | 1/2004 | Snyder et al. | 345/716 |
| 2007/0182864 | A1 | * | 8/2007 | Stoneham et al. | 348/722 |

OTHER PUBLICATIONS

Television Systems Ltd., 'The TSL Tally and UMD Configuring Program—Multiviewer Information', Oct. 1, 2006, Television Systems Ltd., entire document, http://videoengineer.net/documents/manuals/Television%20Systems%20Limited/Tally%20Man%20Multiviewers%20Connections.pdf.*
MVP@ Expect the Best, Accept no Substitutes!, MVP@ Multi-Signal Monitoring Solution, Feb. 14, 2007, pp. 1-8, http://www.evertz.com/mvp.

* cited by examiner

*Primary Examiner* — Edan Orgad
*Assistant Examiner* — Ronald Baum
(74) *Attorney, Agent, or Firm* — Meunier Carlin & Curfman, LLC

(57) ABSTRACT

An integrated real-time display is provided that includes video images and a graphical representation of the transmission path, where each video image is associated with a point along the graphical representation of the transmission path. A number of monitoring points, which correspond to critical points along the transmission path are identified. The points may be selected for technical reasons or economic reasons. The graphical representation of the transmission path can be a logical representation showing the logic blocks along the transmission path or a physical representation showing the devices along the transmission path.

21 Claims, 4 Drawing Sheets

SYSTEM AND METHOD FOR MONITORING BROADCAST SIGNALS

TECHNICAL FIELD

This invention relates in general to monitoring communications signals, and more particularly to a system and method that provides an integrated real-time display that associates television signals with a graphical representation of a transmission path.

BACKGROUND

Entities that produce television signals must ensure that the signals are produced reliably and with sufficient quality. Failure to do so results in a loss of revenue and possibly the imposition of fines by the Federal Communications Commission ("FCC"). Currently television signals can be monitored at various points along a transmission path using a multiview monitoring system provided by manufacturers such as Evertz Microsystems, Ltd. These systems use a patch panel and a screen that displays video images. The video signals at various points along the transmission path are fed to the patch panel and then video images corresponding to the patch panel inputs are displayed. As shown in FIG. 1, the display may include a number of video images on a single screen.

If a problem occurs with the television signal, then the display is consulted to recognize the problem and/or begin debugging the problem. In addition to the display, a schematic of the transmission system is used to identify the device or subsystem that is causing the problem. Because the schematic is separate from the display, it can take several minutes to locate the schematic and then to identify the devices or subsystems that correspond to the problem. In the television industry, every second counts since a problem with a television signal can result in a loss of revenue or a fine based on the duration of the problem.

Another disadvantage of maintaining the schematic separate from the display of the video images is that the relationships between the devices or subsystems is not readily apparent. Sometimes the approach taken to address one problem can create additional, unintended problems For example, if there is a problem with the transmission of an advertisement, it is possible that the way in which the problem is addressed could inadvertently impact closed captioning. Thus, a problem that could have been limited to the transmission of an advertisement may not be addressed properly and can negatively impact other functions, such as the generation of closed captioning.

Another prior art solution is an alarm system that monitors video signals and generates an alarm when an error is detected. One disadvantage of an alarm system is that the amount and type of information provided is typically limited and may only indicate that there is a serious problem. For example, an alarm may be generated when there is no signal present, but may not be generated when the quality of the signal degrades.

Thus, there is a need for a system and method for integrating video image data with information about the transmission system so that problems can be more easily recognized and more efficiently corrected.

SUMMARY OF THE INVENTION

The present invention meets the needs described above by providing a system and method for providing an integrated real-time display that includes video images and a graphical representation of the transmission path, where each video image is associated with a point along the graphical representation of the transmission path. The video images allow a user to determine whether the video signals are present and to evaluate the quality of the signals and the association of the video signals with the logic blocks or devices assists the user in trouble-shooting a problem.

A number of monitoring points are identified along the transmission path. Typically the monitoring points correspond to critical points along the transmission path. The points may be selected for technical reasons, e.g. a problem at the point will affect a number of other functions, or may be selected for economic reasons, e.g. a problem at the point will result in a loss of revenue or a fine. The graphical representation of the transmission path can be a logical representation showing the logic blocks along the transmission path or a physical representation showing the devices along the transmission path. In either case, each of the video images corresponds to a monitoring point and is associated with a logic block or a device on the integrated display. In addition, to providing the integrated display, the present invention may also provide automatic error detection and correction and a transmission log.

These and other aspects, features and advantages of the present invention may be more clearly understood and appreciated from a review of the following detailed description of the disclosed embodiments and by reference to the appended drawings and claims.

DETAILED DESCRIPTION

The present invention is directed towards a system and method for providing an integrated real-time display that associates video images with a graphical representation of the transmission path. Briefly described, a number of monitoring points along the transmission path are identified, including a monitoring point that corresponds to a revenue function. The video images correspond to the monitoring points and provide information about the presence and quality of the video signals along the transmission path. The graphical representation of the transmission path can be a logical representation of the devices or a physical representation of the layout of the devices. By associating the video images with the graphical representation of the transmission path, the display aids in the design and debug of the system.

Logical Representation of Transmission Path

Figure 1:
FIG. 1 is a block diagram of a prior art system.
Figure 2:
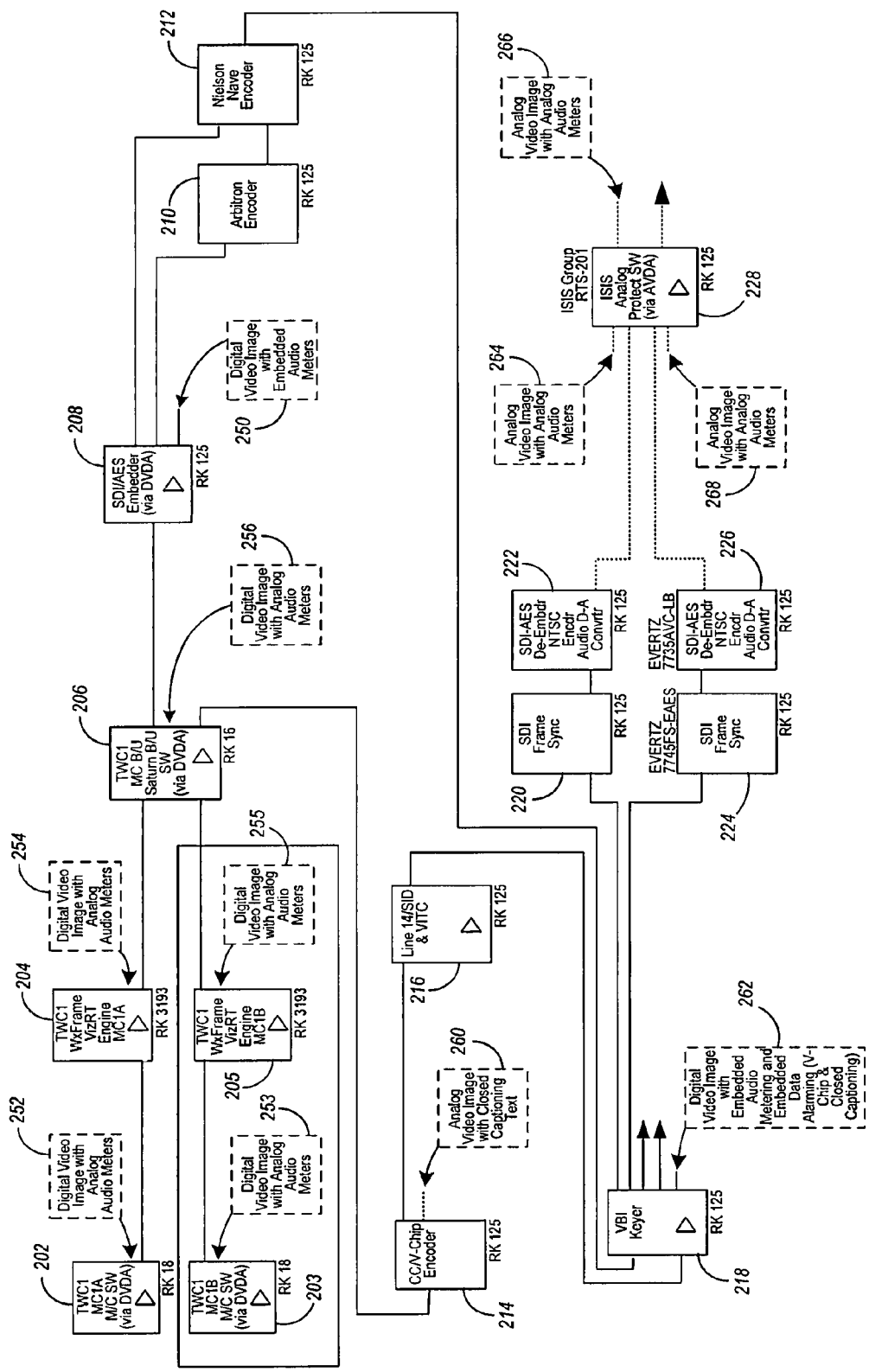
FIG. 2 is a block diagram illustrating an exemplary integrated display in accordance with an embodiment of the invention.

FIG. 2 illustrates an exemplary display that associates video images with points along a transmission path. In this embodiment, the transmission path corresponds to the devices, equipment and systems used to generate a television signal. The transmission path includes a number of logic blocks, 202, 203, 204, 205, 206, 208 . . . 228. The logic blocks can represent a function, a subsystem, a device, a piece of equipment, or any part thereof. For example, logic block 202 corresponds to the master control switcher, which is the origination point for the displayed transmission path. Logic block 204 corresponds to the WEATHERFRAME subsystem, which reduces or squeezes a video image and provides an L-shaped bar around the video image that is used to provide local weather information. Logic block 206 corresponds to the emergency bypass switch and is used to switch between the outputs of logic block 204 and logic block 205. Logic blocks 203 and 205 provide a redundant path to the path that includes logic blocks 202 and 204.

Logic block 208 corresponds to the device(s) that embeds digital audio into the video signal. Logic blocks 210 and 212 correspond to the devices that encode ratings information. Logic block 214 corresponds to the devices that provide text for closed captioning and support v-chip filtering. Logic block 218 corresponds to the device(s) that embeds rating data and closed captioning data into the digital video signal. Logic block 220 corresponds to a frame synchronizer, which is used to stabilize the digital video signal. Logic block 222 corresponds to a de-embedder and an SDI to NTSC converter, which de-embeds the digital audio from the digital video signal and then converts both signals to analog signals. Logic block 228 corresponds to a protect switch, which can switch to a redundant input when needed. Additional information about the logic blocks can also be provided on the display. For example, FIG. 2 also illustrates that the logic blocks are associated with a rack number, e.g. RK 18, RK 125, to help quickly identify the location of the equipment associated with each logic block. The solid lines in FIG. 2 represent a digital video signal and the dashed lines represent an analog video signal.

FIG. 2 also illustrates a number of video images, 252, 253, 254, 255, 256, 258, . . . 266, that are associated with various points along the transmission path referred to herein as monitoring points. The monitoring points typically corresponds to critical points along the transmission path. In some instances the monitoring points are selected so that video images corresponding to approximately the input and the output of a logic block are displayed, which helps identify the source of a problem and the subsystem or device that is likely at fault. The video images allow a user to assess not only the presence or absence of a video signal, but also to detect a frozen image or a degradation in quality of the image.

Some of the monitoring points correspond to revenue functions that generate revenue, such as the WEATHERFRAME function (output of logic blocks 204, 255) and closed captioning (output of logic block 214), and some of the monitoring points correspond to revenue functions that result in fines, penalties or offsets, such as closed captioning and v-chip (output of logic block 214). In some instances the revenue functions overlap, e.g. closed captioning, in other instances the functions are separate. Other types of revenue generating functions, including local programming and local advertising, will be apparent to those skilled in the art. The revenue functions that result in fines, penalties or offsets include requirements imposed by law or rule, such as those imposed by the FCC, as well as those imposed by contract, such as a contract between a content provider and a cable company.

Using the display illustrated in FIG. 2, a user can quickly identify a problem and isolate the problem to the relevant device or subsystem. By integrating the video images with a graphical representation of the transmission path, the user can obtain the information needed to address the problem from a single source. In some embodiments, the user can request additional information by selecting one of the video images or logic blocks using a touch screen, mouse or other type of input device. Once the user selects an image or logic block, the additional information for the selected image or block is displayed. This feature is useful for complex systems where the default display is a high level view of the transmission path and the additional information provides details about the selected subsystem. The additional information can include additional details about the video signal associated with the video image, additional details about the logic block and/or additional components of the logic block. The additional information can be presented in a similar manner to that shown in FIG. 2 or can be presented using text and/or graphics.

Physical Layout of Transmission Path

Figure 3:
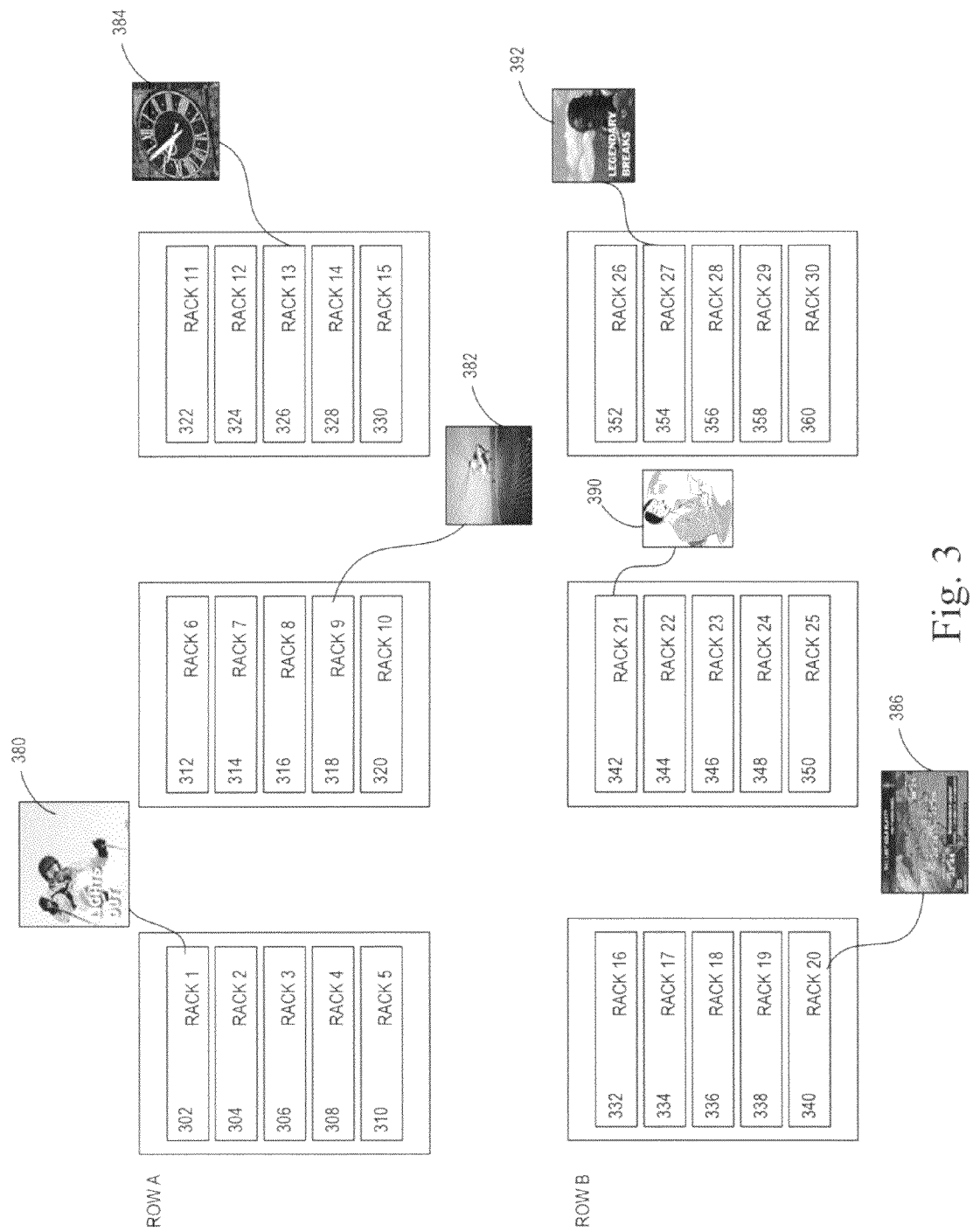
FIG. 3 is a block diagram illustrating an exemplary integrated display in accordance with another embodiment of the invention.

FIG. 3 represents another exemplary display that associates video images with the devices or equipment that generate the images. In this embodiment, the physical layout or arrangement of devices, i.e. locations of devices in racks, is used instead of the logical representation illustrated in FIG. 2. The embodiment illustrated by FIG. 3 associates video images 380, 382, . . . 384 with the physical arrangement of the devices 302, 304, 306, . . . 360 producing the images. The devices are shown as they are positioned in their respective racks and the racks are shown in their relative positions. By displaying the physical layout of the devices, the time to locate a device associated with a problem is greatly reduced.

The display illustrated by FIG. 3 can be the default display or can be provided in response to a user's request for additional information when the display illustrated by FIG. 2 is the default display. If the display illustrated by FIG. 3 is the default display, then the display illustrated by FIG. 2 can be provided in response to a user's request for additional information.

Although FIGS. 2 and 3 illustrate embodiments for monitoring signals that are typically produced within a production facility, the invention can be expanded to cover signals throughout a distribution system. In one embodiment, signals are distributed via satellite using an uplink facility and the monitored signals include signals sent to the satellite and signals received from the satellite.

Automatic Error Detection

The displays shown in FIGS. 2 and 3 provides a user with an integrated real-time view of the operation of the transmission system. The video images allow the user to determine whether the video signals are present and to evaluate the quality of the signals, and the association of the video images with the logic blocks assists the user in trouble-shooting a problem. In addition, to providing the integrated display, the present invention may also provide automatic error detection and correction. The video signals at any of the monitoring points can be monitored using the alarm capability that is currently available in many video devices or using a separate monitor. When an alarm condition is detected, an alarm indicator can be shown on the display illustrated by FIGS. 2 and 3, a notification can be sent to one or more users, and/or a patch can be put in place. If an alarm indicator is shown on the display, then the alarm indicator may be shown proximate to the video image that corresponds to the video signal that caused the alarm. The alarm indicator can include additional information about the error. Different indicators or different colors can be used to indicate the severity or type of the error.

The present invention can use messages, pages, alerts, and any other forms of notification to notify a user of an error. If the system detects a problem at one of the monitoring points, then based on information previously entered into the system, a message, page or alert can be sent to the appropriate user(s). The notification can include a display, such as shown in FIGS. 2 and 3, text and/or other graphics.

In some embodiments, the system can automatically correct an error by switching to a back up system or putting a patch in place. If the system generates an alarm indicator and/or an alarm notification, and no action is taken within a prescribed period of time, then the system can switch to a back-up system or put a patch in place. For example, if an error condition is detected at the output of logic block 204 and no action is taken within the prescribed period of time, then logic block 206 can switch inputs and use the output of logic block 205.

Transmission Log

The present invention facilitates the generation of a log of the signals generated during the actual transmission. The log is useful in analyzing errors and more accurately determining revenue or fines since the log can identify localized errors. An error seen in one viewing area may not necessarily be seen in other viewing areas or an error affecting closed captioning may not necessarily affect ratings. The video signals for a monitoring point associated with a revenue function can be sent to a recording/storage device, such as a digital video recorder. When an error is detected, the video can be reviewed to determine the type and scope of the error. If the transmission log establishes that an error was localized instead of global, then any revenue/fines can be more accurately determined. For example, an error that was limited to a specific geographic area, should reduce advertising revenue, but not eliminate the revenue entirely since the advertisement was played in some areas.

Exemplary Method for Providing Integrated Display

Figure 4:
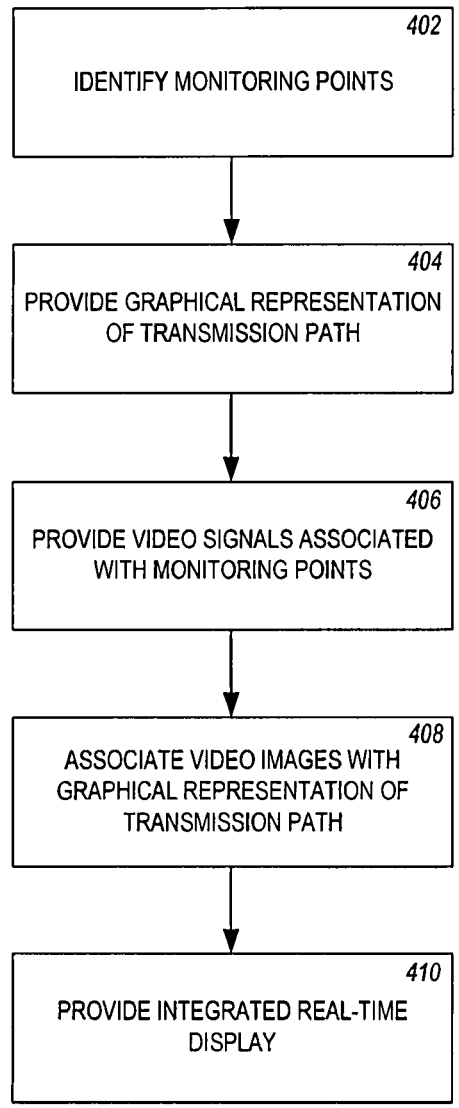
FIG. 4 is a flow diagram illustrating an exemplary method for providing an integrated display in accordance with an embodiment of the invention.

FIG. 4 illustrates an exemplary method for providing an integrated display, such as those shown in FIGS. 2 and 3. The method begins with the identification of the monitoring points at 402. Typically the monitoring points correspond to critical points along the transmission path. The points may be selected for technical reasons or may be selected for economic reasons. An example of a monitoring point selected for a technical reason is a point that feeds a number of different subsystems. An example of a monitoring point that is selected for an economic reason is a point that corresponds to a revenue function, such as localized programming or v-chip.

A graphical representation of the transmission path is provided at 404. The graphical representation can be created especially for this application or can use a schematic, plan or drawing used for another purpose, such as the design and installation of the system. The video signals associated with the monitoring points are provided at 404. The video signals are used to create video images, which are associated with the appropriate points on the graphical representation at 408. The integrated real-time display is output at 410. The method can be implemented in hardware, firmware, software or any combination thereof and may be stored as computer-executable instructions on a computer-readable medium.

Although the foregoing description describes exemplary embodiments that use television signals, the invention is not limited to television signals and can be used for any system where the association of a video image with a block or device associated with the image would be useful. Additional alternative embodiments will be apparent to those skilled in the art to which the present invention pertains without departing from its spirit and scope. For example, the system can operate with any type of video signals, including standard definition, high definition, digital and analog signals. Accordingly, the scope of the present invention is described by the appended claims and is supported by the foregoing description.

What is claimed is:

1. A method for monitoring a television broadcast signal, comprising:

identifying a plurality of monitoring points along a transmission path for the television signal, wherein each monitoring point corresponds to a point along the transmission path and is selected for at least one of technical and economic reasons, wherein the monitoring points include a monitoring point associated with a revenue function, and wherein the revenue function is responsive to a change in state of the associated monitoring point;

providing a plurality of video images corresponding to the monitoring points, each of the video images corresponding to a video signal at each of the monitoring points, wherein the video signal and corresponding video images are acquired and provided in real time;

providing a graphical representation of the transmission path including a plurality of functional blocks for generating the television signal;

providing an integrated real-time output on a display device; and in response to detecting an error, automatically switching between devices or automatically reconfiguring the transmission path to correct the error, wherein the output provides a single display showing the video images and the graphical representation of the transmission path, wherein each video image is associated with a point along the graphical representation of the transmission path, and wherein at least two of the video images correspond to an input and an output of one of the functional blocks in the graphical representation of the transmission path.

2. The method of claim 1, wherein the monitoring point associated with a revenue function is associated with a revenue function selected from the following: closed captioning, v-chip, television ratings, advertising, and localized programming.

3. The method of claim 1, wherein the graphical representation of the transmission path comprises a logical representation of the transmission path.

4. The method of claim 3, wherein the logical representation includes a plurality of logic blocks and providing an integrated real-time output further comprises:

in response to receiving a selection of one of the logic blocks, providing additional information about the selected logic block.

5. The method of claim 1, wherein the graphical representation of the transmission path comprises a physical representation of devices used along the transmission path.

6. The method of claim 5, wherein the physical representation includes a plurality of devices and providing an integrated real-time output further comprises:

in response to receiving a selection of one of the devices, providing additional information about the selected device.

7. The method of claim 1, further comprising:

generating a log of at least one of the video signals.

8. The method of claim 1, wherein each video image is displayed on the display device in relation to the point along the graphical representation of the transmission path.

9. A system for monitoring a television broadcast signal, comprising:

a plurality of devices connected to form a transmission path for the television signal, wherein each device receives or generates a video signal;

a plurality of monitoring points along the transmission path, wherein each monitoring point corresponds to a point along the transmission path and is selected for at least one of technical and economic reasons, wherein the monitoring points include a monitoring point associated with a revenue function, and wherein the revenue function is responsive to a change in state of the associated monitoring point; and a display device for providing an integrated real-time output, wherein the output provides a single display showing a plurality of video images corresponding to the video signals at the monitoring points, wherein the video signals and corresponding video images are acquired and provided in real time, wherein each video image is associated with a point on a graphical representation of the transmission path including graphical representations of the plurality of devices, wherein at least two of the video images correspond to an input and an output of one of the graphical representations of the devices in the graphical representation of the transmission path, and wherein in response to detecting an error, the error is corrected by automatically switching between devices or reconfiguring the transmission path.

10. The system of claim 9, wherein the graphical representation of the transmission path comprises a logical representation of the transmission path.

11. The system of claim 9, wherein the graphical representation of the transmission path comprises a physical representation of the devices along the transmission path.

12. The system of claim 9, further comprising:
an input device for allowing a user to obtain additional information about one of the devices associated with one of the video images.

13. The system of claim 9, further comprising:
a communication device for sending an alert to a user when an error is detected in one of the video images or devices.

14. The system of claim 9, further comprising:
a video recorder for creating a log of at least one of the video signals.

15. A method for monitoring a television broadcast signal, comprising:
receiving a plurality of video signals corresponding to a plurality of monitoring points along a transmission path for the television signal, wherein each monitoring point corresponds to a point along the transmission path and is selected for at least one of technical and economic reasons, wherein the monitoring points include a monitoring point associated with a revenue function, and wherein the revenue function is responsive to a change in state of the associated monitoring point;

receiving a graphical representation of the transmission path which identifies each monitoring point and includes a plurality of functional blocks for generating the television signal;

providing an integrated real-time output on a display device, wherein the output provides a single display showing video images corresponding to the video signals and the graphical representation of the transmission path, wherein the video signals and corresponding video images are acquired and provided in real time, wherein each video image is associated with a point along the graphical representation of the transmission path, wherein at least two of the video images correspond to an input and an output of one of the functional blocks in the graphical representation of the transmission path;

providing an alert if an error is detected in any one of the video images; and in response to detecting the error, automatically switching between devices or reconfiguring the transmission path to correct the error.

16. The method of claim 15, wherein the revenue function is selected from the following:
closed captioning, v-chip, television ratings, advertising and localized programming.

17. The method of claim 15, wherein the alert comprises an alert that indicates a severity level of the error.

18. The method of claim 15, wherein providing an alert comprises sending a message to a user.

19. The method of claim 15, further comprising generating a log of at least one of the video signals.

20. The method of claim 15, wherein the graphical representation of the transmission path comprises a logical representation of the transmission path.

21. The method of claim 15, wherein the graphical representation of the transmission path comprises a physical representation of devices along the transmission path.

\* \* \* \* \*